US005695633A

United States Patent [19]
Ernst et al.

[11] Patent Number: 5,695,633
[45] Date of Patent: Dec. 9, 1997

[54] OIL FILTER SUPPORT TUBE AND HOUSING COVER WITH SNAP DETENT CONNECTION THEREBETWEEN

[75] Inventors: Volker Ernst, Sachsenheim; Herbert Jainek, Heilbronn; Arthur Klotz, Remseck, all of Germany

[73] Assignee: Filterwerk Mann & Hummel GmbH, Ludwigsburg, Germany

[21] Appl. No.: 591,010

[22] Filed: Jan. 24, 1996

[30] Foreign Application Priority Data

Jan. 24, 1995 [DE] Germany ............... 19502020

[51] Int. Cl.$^6$ ........................................... B01D 35/34
[52] U.S. Cl. ................... 210/130; 210/232; 210/440; 210/441
[58] Field of Search ................. 210/130, 429, 210/440, 441, 454, 455, 457, 232

[56] References Cited

U.S. PATENT DOCUMENTS

| | | |
|---|---|---|
| 4,906,365 | 3/1990 | Baumann et al. . |
| 4,948,503 | 8/1990 | Baumann et al. . |
| 5,374,355 | 12/1994 | Habiger et al. . |
| 5,389,246 | 2/1995 | Zinga .................. 210/130 |
| 5,413,712 | 5/1995 | Gewiss et al. ............ 210/457 |
| 5,538,626 | 7/1996 | Baumann ................. 210/440 |

FOREIGN PATENT DOCUMENTS

| | | |
|---|---|---|
| 319518 | 6/1989 | European Pat. Off. . |
| 2259636 | 10/1975 | France . |
| 87 14 656.8 | 2/1988 | Germany . |
| 93 12856 | 11/1991 | Germany . |
| 4131353 | 10/1992 | Germany . |
| 4240656 | 7/1993 | Germany . |
| 93 12 856 | 11/1993 | Germany . |
| 93 12 857.6 | 11/1993 | Germany . |
| 4243217 | 6/1994 | Germany . |
| 4303695 | 8/1994 | Germany . |
| 94 11 212.6 | 10/1994 | Germany . |
| 4430341 | 3/1995 | Germany . |
| WO 92/17262 | 10/1992 | WIPO . |

*Primary Examiner*—Matthew O. Savage
*Attorney, Agent, or Firm*—Evenson, McKeown, Edwards & Lenahan P.L.L.C.

[57] ABSTRACT

A fluid filter, particularly for cleaning lubricating oil for internal-combustion engines of motor vehicles, which includes a filter housing 10 with a screw cap 11 and an annular filter element 12 inserted into the filter housing 10. The filter element 12 is pushed onto a supporting tube 15, which in turn is locked to the cap 11 or the bottom of the filter housing 10. Arranged on the cap or on the bottom are detent tongues 18 which engage with detent tongues 20 of the supporting tube 1B. Guiding surfaces 21 are provided for the detent tongues of at least one element.

8 Claims, 2 Drawing Sheets

OIL FILTER SUPPORT TUBE AND HOUSING COVER WITH SNAP DETENT CONNECTION THEREBETWEEN

BACKGROUND OF THE INVENTION

This invention relates to a fluid filter, particularly for cleaning lubricating oil for internal-combustion engines of motor vehicles, consisting of a filter housing with a screw cap, having an annular filter element inserted into the filter housing, an oil inlet for the oil to be cleaned, an oil outlet for the filtered oil connected with the central interior of the filter housing, and in which the filter element is pushed onto a supporting tube, and the supporting tube is locked to the cap or to the bottom of the filter housing.

Published European Patent Application No. EP 319,518 discloses an oil filter for cleaning lubricating oil, particularly for internal-combustion engines. In this oil filter, an oil filter element is situated in a filter housing having a screw cap. The oil filter element is locked on the screw cap, the screw cap being provided with flexible tongues which project into the interior of the filter and have detent projections. At the end oriented toward the cap, the filter element has a circular detent recess which has a reduced diameter and matches the detent projections.

It is a disadvantage of this arrangement that the filter element must be provided with a suitable end plate which both seals off the filter element and also is provided with the detent elements. In addition, this prior art filter element carries a supporting body in the form of a metallic support- ing tube. Filter elements of this type must be exchanged at regular intervals because their flow resistance increases as a result of the accumulated dirt. Consequently, the exchanged filter element must be disposed of. High waste disposal costs are encountered in disposing of these prior art filter elements because a large number of different materials are involved.

Furthermore, German Utility Model No. DE-GM 93 12 856 discloses a conversion kit for a fluid filter. In this fluid filter, the filter element consists of only a paper filter insert with end plates. Instead of a supporting body arranged on the filter element, a supporting tube is provided which is fastened to the cap of the fluid filter. However, it is a disadvantage of this arrangement that the supporting tube is only inserted onto the cap. There is a risk that, during the removal of a filter element, the supporting tube will be removed simultaneously and then a replacement will have to be procured subsequently.

SUMMARY OF THE INVENTION

It is an object of the invention to provide a fluid filter with a filter element which can be disposed of without any problems, so that use of the filter will not be harmful to the environment.

It is also an object of the invention to provide a fluid filter in which parts which are not to be exchanged are fastened to the housing parts so that they cannot be lost.

These and other objects are achieved in accordance with the present invention by providing a fluid filter comprising a filter housing with a screw cap; an annular filter element arranged in the filter housing; an oil inlet for admitting oil to be filtered into a first portion of the housing on one side of the filter element; an oil outlet for filtered oil communicating with a second portion of the filter housing on an opposite sine of the filter element; a centrally arranged supporting tube for supporting the filter element, the supporting tube being attached to the cap or to a bottom of the filter housing by first detent tongues arranged on the cap or on the bottom, which first detent tongues engage second detent tongues on the supporting tube; and guiding surfaces for guiding at least the first detent tongues or the second detent tongues into a locked position.

In accordance with another aspect of the invention, the objects are also achieved by providing a fluid filter comprising a filter housing with a screw cap, an annular filter element arranged in the filter housing, an oil inlet for admitting oil to be filtered into a first portion of the housing on one side of the filter element; an oil outlet for filtered oil communicating with a second portion of the filter housing on an opposite side of the filter element; a centrally arranged supporting tube for supporting the filter element, the supporting tube being attached to the cap or to a bottom of the filter housing by first detent tongues arranged on the cap or on the bottom and second detent tongues provided on the supporting tube, the second detent tongues engaging the first detent tongues on the cap or the bottom; the first detent tongues having a different elasticity than the second detent tongues.

It is an advantage of the invention that, although the supporting tube can be locked on the cap or on the bottom of the filter housing in a simple manner as a result of the detent tongues, the design of the guiding surfaces makes it almost impossible to disassemble or separate the supporting tube from the cap or the bottom.

According to a particularly advantageous embodiment of the invention, the guiding surfaces are provided with so-called inclined inlet areas; that is, the detent tongues are guided by inclined surfaces into their end position in order to prevent bending or improper attachment of the supporting tube.

In a further embodiment of the invention, a relief valve is provided inside the supporting tube. If the filter element is completely fouled by accumulated dirt or if a short-term operating condition arises in which very viscous oil must be pumped through the filter, this relief valve serves to feed the incoming oil directly to the oil outlet so that lubrication of the engine will not be interrupted.

Advantageously, this relief valve may be frictionally fitted onto the supporting tube by means of a sealing ring. It is also possible to weld the relief valve directly to the supporting tube, for example, by means of a friction welding process or an ultrasonic welding process.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
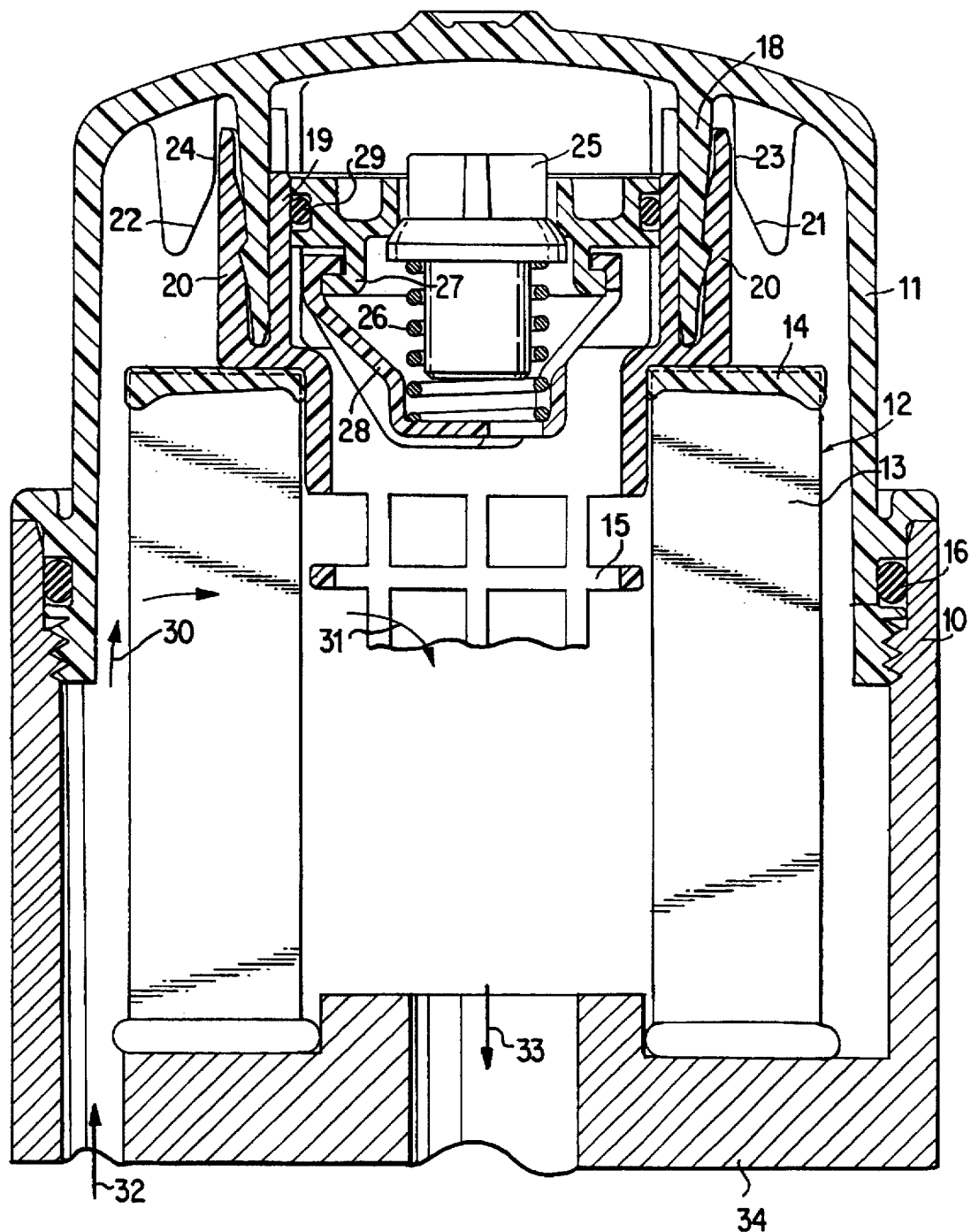
FIG. 1 is a sectional view of a fluid filter.

FIG. 1 depicts a fluid filter which comprises a filter housing 10 which is closed by a cap 11. A concentrically arranged filter element 12, which comprises an accordion-folded filter paper 13 and end face plates 14, is situated in the housing. The filter element 12 surrounds a supporting tube 15 and rests sealingly by means of its end plates 14 against the supporting tube. The cap 11 is secured to the filter housing 10 by means of a screw thread. In order to seal off the closure, an O-ring 16 is situated in a corresponding groove 17 in the closure area. In order to fasten the supporting tube 15 to the cap 11, the cap is provided with two detent tongues 18. In the area of the detent tongues, the supporting tube has an annular contact surface 19 as well as additional detent tongues 20 which can be engaged with the cap detent tongues 18. When the supporting tube is pushed onto the cap 11, the tube detent tongues 20 are supported by guiding surfaces 21, 22. These guiding surfaces lead into a holding area 23, 24 which prevents the supporting body 15 from being detached from the cap 11 after it has once been engaged therewith. A detaching of the supporting body 15 from the cap 11 can at most be carried out by the application of very high tensile forces. The arrangement of the guiding surfaces and the holding areas ensures that the supporting body 15 will not separate from the cap 11 when the filter element 14 is removed from the supporting body. On the other hand, the arrangement also ensures that the supporting body 15 will engage on the cap 11 in a simple manner.

A relief valve is situated inside the supporting body 15. This relief valve comprises a valve body 25, a valve spring 26, and a two-part valve housing 27, 28. The valve housing 27 is fastened on the contact surface 19 by means of an O-ring 29. Alternatively, it is also possible to weld the valve housing to the supporting tube or supporting body, for example by means of ultrasonic welding.

The oil to be cleaned flows from underneath through an oil inlet 32 according to the arrow 30 through the filter element, is filtered there and then leaves the fluid filter through the center tube and an oil outlet 33 as indicated by arrow 31. If the filter element becomes dirty and is not exchanged in time before it is completely fouled, then the oil can flow from the outside of the filter element into the interior through the relief valve between the detent tongues 40 and thence downward through the supporting tube 15.

Figure 2:
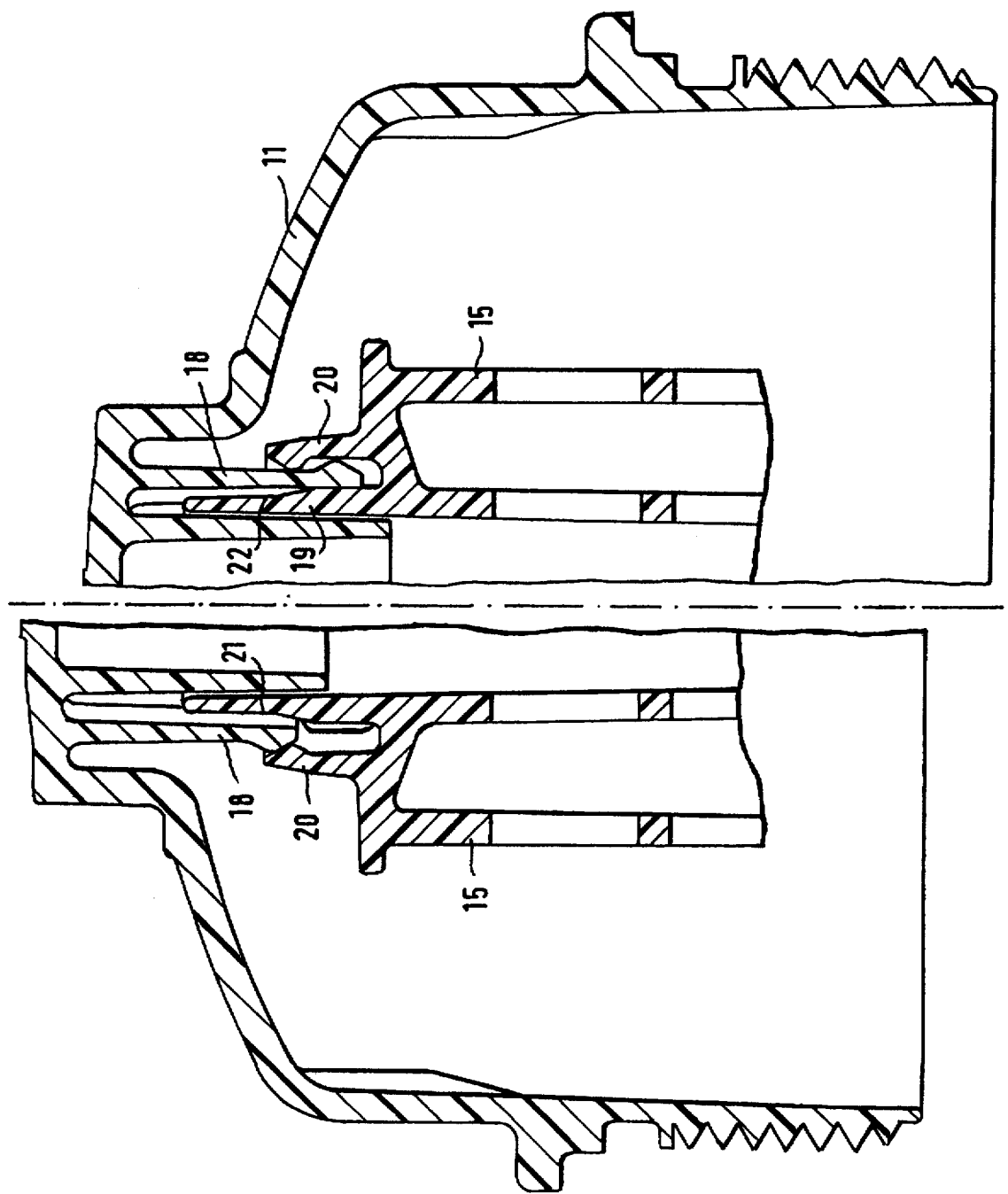
FIG. 2 is a sectional view of a variant fluid filter embodiment.

FIG. 2 shows a variant fluid filter embodiment. The supporting tube 15 also has detent tongues 20 as well as contact surfaces 19. The cap 11 has detent tongues 18 which engage between the contact surfaces 19 and the detent tongues 20, so that reliable locking of the supporting tube 15 to the cap 11 is also ensured in this embodiment. The contact surfaces 19 are also equipped with guiding surfaces 21, 22. In order to improve the locking effect, the detent tongues of the cap may be made of a plastic material which has a lower modulus of elasticity than the detent tongues of the supporting tube. This means that the holding tongues of the supporting tube have a high stiffness. Naturally, this high stiffness may alternatively be achieved by means of an appropriate geometrical design of the holding tongues. Alternatively, the detent tongues of the cap may be made of a material which has a higher modulus of elasticity than the detent tongues of the supporting tube.

In the semi-sectional view of FIG. 2 shown on the left of the center line, the supporting tube 15 is not yet in its end position. This portion of the Figure illustrates how the detent tongue 18 slides along the guiding surface 21 and, because of the inclined shape of the guiding surface, bends toward the inside before it catches in order to overcome the resistance between the detent tongue 20 and the guiding surface 21. This establishes an extremely reliable detent connection. The detent tongues 20 are designed with a different geometrical configuration, i.e., shorter in length, than the detect tongues 18. Accordingly, the detent tongues 20 are more rigid than the detent tongues 18.

The detent tongue 18 is deformed toward the inside during the detent operation by means of the detent tongue 20. By means of the inserting bevel or inclined guide surface 21, the stiff detent tongue 20 is spread by means of the soft detent tongue 18. After the detent tongue snaps into the final position, i.e. after insertion is completed, the connection will be free of tension. A flowing of the plastic material because of high temperatures will not take place.

When the fluid filter is opened up, the locking arrangement will prevent the rotating movement of the cap from being converted to a rotating movement of the filter element 12. Instead, the filter element and the supporting tube 15 are only moved axially as the cap is removed.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A filter assembly comprising:

a housing having an open end;

a cover for closing the open end of said housing;

a tubular filter element disposed within said housing, said filter element having a pair of open ends and an inner cylindrical surface;

a support tube coaxially arranged about a central axis disposed within said filter element for supporting said inner cylindrical surface;

an annular plate unitary with a first end of said support tube and extending radially outwardly from said support tube for supporting one of the open ends of said filter element;

a cylindrical member unitary with said annular plate and extending in a direction axially opposite said support tube and towards said cover;

first and second detent tongues unitary with said annular plate and positioned on diametrically opposite sides of said plate, wherein said first and second detent tongues are spaced radially outwardly of said cylindrical member and extend in a direction axially opposite said support tube and towards said cover, wherein said first and second detent tongues include recesses on radially innermost surfaces thereof;

third and fourth detent tongues unitary with said cover and positioned in radial spaces between said first detent tongue and said cylindrical member and said second detent tongue and said cylindrical member, respectively, wherein said third and fourth detent tongues include projections on radially outermost surfaces thereof for forming respective detent connections with the recesses on the radially innermost surfaces of the first and second detent tongues, respectively;

first and second guide members unitary with said cover and spaced radially outwardly of said first and second detent tongues, respectively, wherein said first and second detent tongues are positioned in radial spaces between said third detent tongue and said first guide member and said fourth detent tongue and said second guide member, respectively.

2. A fluid filter according to claim 1, further comprising a relief valve arranged in the cylindrical member for bypassing said filter element.

3. A fluid filter according to claim 2, wherein said relief valve is frictionally fit in a fluid-tight manner inside said cylindrical member with an annular sealing ring interposed between said relief valve and said support tube.

4. A fluid filter according to claim 1, wherein said first and second guide members include guiding surfaces which are inclined with respect to said central axis for guiding said first and second detent tongues toward said third and fourth detent tongues, respectively.

5. A filter assembly comprising:

a housing having an open end;

a cover for closing the open end of said housing;

a tubular filter element disposed within said housing, said filter element having a pair of open ends and an inner cylindrical surface;

a support tube coaxially arranged about a central axis disposed within said filter element for supporting said inner cylindrical surface;

an annular plate unitary with a first end of said support tube and extending radially outwardly from said support tube for supporting one of the open ends of said filter element;

first and second detent tongues unitary with said annular plate and positioned on diametrically opposite sides of said plate, wherein said first and second detent tongues extend in a direction axially opposite said support tube and towards said cover, wherein said first and second detent tongues including recesses on radially innermost surfaces thereof;

first and second guide members unitary with said annular plate, wherein said first and second guide members are spaced radially inwardly of said first and second detent tongues, respectively, and extend in a direction axially opposite said support tube and towards said cover;

third and fourth detent tongues unitary with said cover and positioned in radial spaces between said first detent tongue and said first guide member and said second detent tongue and said second guide member, respectively, wherein said third and fourth detent tongues include projections on radially outermost surfaces thereof for forming respective detent connections with the recesses on the radially innermost surfaces of the first and second detent tongues, respectively.

6. A fluid filter according to claim 5, wherein said first and second detent tongues are formed of a material having a higher modulus of elasticity than said third and fourth detent tongues.

7. A fluid filter according to claim 5, wherein said first and second detent tongues have a different geometric configuration than said third and fourth detent tongues, such that said first and second detent tongues are more rigid than the third and fourth detent tongues.

8. A fluid filter according to claim 5, wherein said first and second guide members include guiding surfaces which are inclined with respect to said central axis for guiding said third and fourth detent tongues toward said first and second detent tongues, respectively.

* * * * *